US008900746B2

(12) United States Patent
Kondo

(10) Patent No.: US 8,900,746 B2
(45) Date of Patent: Dec. 2, 2014

(54) AQUEOUS SECONDARY BATTERY

(75) Inventor: Hiroki Kondo, Nisshin (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 622 days.

(21) Appl. No.: 12/899,804

(22) Filed: Oct. 7, 2010

(65) Prior Publication Data

US 2011/0086266 A1    Apr. 14, 2011

(30) Foreign Application Priority Data

Oct. 13, 2009 (JP) ................................ 2009-236339
Jun. 16, 2010 (JP) ................................ 2010-137419

(51) Int. Cl.
| H01M 6/04 | (2006.01) |
| H01M 10/26 | (2006.01) |
| H01M 4/02 | (2006.01) |
| H01M 4/58 | (2010.01) |
| H01M 4/66 | (2006.01) |
| H01M 10/36 | (2010.01) |

(52) U.S. Cl.
CPC ............ *H01M 4/5825* (2013.01); *H01M 4/661* (2013.01); *H01M 10/36* (2013.01); *H01M 2300/0002* (2013.01)
USPC ............................ 429/206; 429/188; 429/209

(58) Field of Classification Search
None
See application file for complete search history.

(56) References Cited

U.S. PATENT DOCUMENTS

| 4,529,676 A * | 7/1985 | Galloway et al. ............. 429/103 |
| 5,910,382 A * | 6/1999 | Goodenough et al. ..... 429/218.1 |
| 6,461,495 B1 * | 10/2002 | Morrissey et al. ............ 205/687 |
| 2002/0192553 A1 * | 12/2002 | Barker et al. .................. 429/224 |
| 2008/0213674 A1 * | 9/2008 | Okada et al. ................... 429/344 |
| 2010/0136427 A1 | 6/2010 | Kondo et al. |

FOREIGN PATENT DOCUMENTS

| JP | A-2000-77073 | 3/2000 |
| JP | A-2000-340256 | 12/2000 |
| JP | A-2001-102086 | 4/2001 |
| JP | A-2002-110221 | 4/2002 |
| JP | A-2003-17057 | 1/2003 |
| JP | A-2004-533706 | 11/2004 |
| JP | A-2008-235260 | 10/2008 |
| JP | A-2009-110931 | 5/2009 |

(Continued)

OTHER PUBLICATIONS

Wang et al., Electrochemical properties of TiP2O7 and LiTi2(PO4)3 as anode material for lithium ion battery with aqueous solution electrolyte; Nov. 27, 2006, Electrochimica Acta 52, pp. 3280-3285.*

(Continued)

*Primary Examiner* — Patrick Ryan
*Assistant Examiner* — Adam A Arciero
(74) *Attorney, Agent, or Firm* — Oliff PLC

(57) ABSTRACT

An aqueous secondary battery 10 according to the present invention includes a positive electrode containing a NASICON-type positive-electrode active material that can insert and extract sodium as a positive-electrode active material 12, a negative electrode containing a negative-electrode active material 17 that can insert and extract sodium, and an electrolyte solution 20 disposed between the positive electrode and the negative electrode, the electrolyte solution 20 being an aqueous solution in which sodium is dissolved. The NASICON-type positive-electrode active material is, for example, $Na_3V_2(PO_4)_3$, and the electrolyte solution 20 is an aqueous solution in which sodium is dissolved. The negative-electrode active material 17 is preferably a NASICON-type negative-electrode active material (for example, $LiTi_2(PO_4)_3$ or $NaTi_2(PO_4)_3$).

16 Claims, 2 Drawing Sheets

(56) References Cited

FOREIGN PATENT DOCUMENTS

| WO | WO 02/097907 A2 | 12/2002 |
| WO | WO 2009/008280 A1 | 1/2009 |
| WO | WO 2009/126525 A2 | 10/2009 |

OTHER PUBLICATIONS

Athouël, L. et al., "Variation of the $MnO_2$ Birnessite Structure Upon Charge/Discharge in an Electrochemical Supercapacitor Electrode in Aqueous $Na_2SO_4$ Electrolyte," *J. Phys. Chem. C*, 2008, pp. 7270-7277, vol. 112.

Qu, Q.T. et al., "A New Cheap Asymmetric Aqueous Supercapacitor: Activated Carbon/$NaMnO_2$," *Journal of Power Sources*, 2009, pp. 1222-1225, vol. 194.

Whitacre, J.F. et al., "$Na_4Mn_9O_{18}$ As a Positive Electrode Material for an Aqueous Electrolyte Sodium-Ion Energy Storage Device," *Electrochemical Communications*, 2010, pp. 463-466, vol. 12.

Sep. 25, 2012 Office Action cited issued in Japanese Patent Application No. 2010-137419 (with translation).

Japanese Office Action issued in Japanese Patent Application No. 2009-236339 on Sep. 27, 2011 (with translation).

\* cited by examiner

AQUEOUS SECONDARY BATTERY

BACKGROUND OF THE INVENTION

1. Field of the Invention

The present invention relates to an aqueous secondary battery and, more particularly, to an aqueous secondary battery in which sodium is dissolved.

2. Description of the Related Art

Aqueous lithium-ion secondary batteries that contain an aqueous solution as an electrolyte solution are conventionally known. In general, aqueous lithium-ion secondary batteries have the following advantages over the problems of non-aqueous lithium-ion secondary batteries. Since aqueous lithium-ion secondary batteries contain no organic solvent in the electrolyte solution, aqueous lithium-ion secondary batteries are basically non-flammable. Furthermore, since aqueous lithium-ion secondary batteries obviate the necessity for dry environments in a manufacturing process, manufacturing costs can be considerably reduced. In addition, since aqueous electrolyte solutions have higher electrical conductivity than non-aqueous electrolyte solutions, aqueous lithium-ion secondary batteries have lower internal resistance than non-aqueous lithium-ion secondary batteries. Contrary to these advantages, since aqueous lithium-ion secondary batteries should be used in such an electric potential range that water is not electrolyzed, aqueous lithium-ion secondary batteries have smaller electromotive forces than non-aqueous lithium-ion secondary batteries. Thus, aqueous lithium-ion secondary batteries ensure a high degree of safety, low cost, and low internal resistance at the expense of high voltage and high energy density.

Example of negative-electrode active materials for aqueous lithium-ion secondary batteries include Fe oxides (see, for example, Japanese Unexamined Patent Application Publication No. 2000-340256), Fe polyanion compounds (see Japanese Unexamined Patent Application Publication No. 2002-110221), and lithium vanadium oxides (see Japanese Unexamined Patent Application Publications No. 2001-102086, No. 2000-77073, and No. 2003-17057).

A capacitor recently proposed contains a Mn-based sodium ion insertion/extraction material, such as $Na_4Mn_9O_{18}$ (see, for example, L. Athouel et al., J. Phys. Chem. C, (2008) 112, 7270-7277), $NaMnO_2$ (see Q. T. Qu et al., J. Power Sources, 194 (2009) 1222-1225), or $MnO_2$ (see J. F. Whitacre et al., Electrochem. Commun., 12 (2010) 463-466), as a positive electrode and an activated carbon as a negative electrode. The activated carbon utilizes electric double layer capacitance.

SUMMARY OF THE INVENTION

Although aqueous lithium-ion secondary batteries that contain an aqueous electrolyte solution and aqueous capacitors that utilize sodium insertion and extraction have been reported, aqueous sodium secondary batteries that contain an aqueous electrolyte solution have not been reported. Active materials that can insert and extract lithium do not necessarily insert and extract sodium. Furthermore, active materials that can function in non-aqueous electrolyte solutions do not necessarily function in aqueous electrolyte solutions. Thus, there is a demand for an active material that can insert and extract sodium in an aqueous electrolyte solution. Although the capacitor that contains a Mn-based sodium ion insertion/extraction material described above can function using an aqueous electrolyte solution containing sodium, the capacitor has a low energy density and requires an improvement in energy density.

In view of the situations described above, it is a principal object of the present invention to provide an aqueous secondary battery containing an active material that can function in an aqueous electrolyte solution containing sodium. It is another object of the present invention to provide an aqueous secondary battery containing a positive-electrode active material that can function in an aqueous electrolyte solution containing sodium and that can improve energy density.

As a result of diligent research to achieve the objects described above, the present inventors completed the present invention by finding that a compound having a NASICON structure serving as an active material can insert and extract sodium in an aqueous electrolyte solution containing sodium and can improve energy density.

An aqueous sodium secondary battery according to the present invention is an aqueous secondary battery in which sodium is dissolved, includes:

a positive electrode containing a positive-electrode active material that can insert and extract sodium;

a negative electrode containing a negative-electrode active material that can insert and extract sodium; and an electrolyte solution disposed between the positive electrode and the negative electrode, the electrolyte solution being an aqueous solution in which sodium is dissolved, wherein at least one of the positive-electrode active material and the negative-electrode active material is a NASICON-type compound that can insert and extract sodium.

An aqueous secondary battery according to the present invention can operate with an aqueous electrolyte solution containing sodium. Use of a NASICON-type compound in the positive electrode can improve energy density. This aqueous secondary battery can employ sodium, which is a naturally abundant resource. The aqueous secondary battery can produce high output power and have high rate performance. This is probably because the aqueous secondary battery has the same advantages as aqueous lithium secondary batteries, and the interaction of sodium ions with water is smaller than the interaction of lithium ions with water.

BEST MODES FOR CARRYING OUT THE INVENTION

An aqueous secondary battery according to the present invention includes a positive electrode containing a positive-electrode active material that can insert and extract sodium, a negative electrode containing a negative-electrode active material that can insert and extract sodium, and an electrolyte solution disposed between the positive electrode and the negative electrode, the electrolyte solution being an aqueous solution in which sodium is dissolved, wherein at least one of the positive-electrode active material and the negative-electrode active material is a NASICON-type compound that can insert and extract sodium. More specifically, the positive electrode may contain a NASICON-type positive-electrode active material, the negative electrode may contain a NASICON-type negative-electrode active material, or the positive electrode and the negative electrode may contain a NASICON-type active material.

Figure 2:
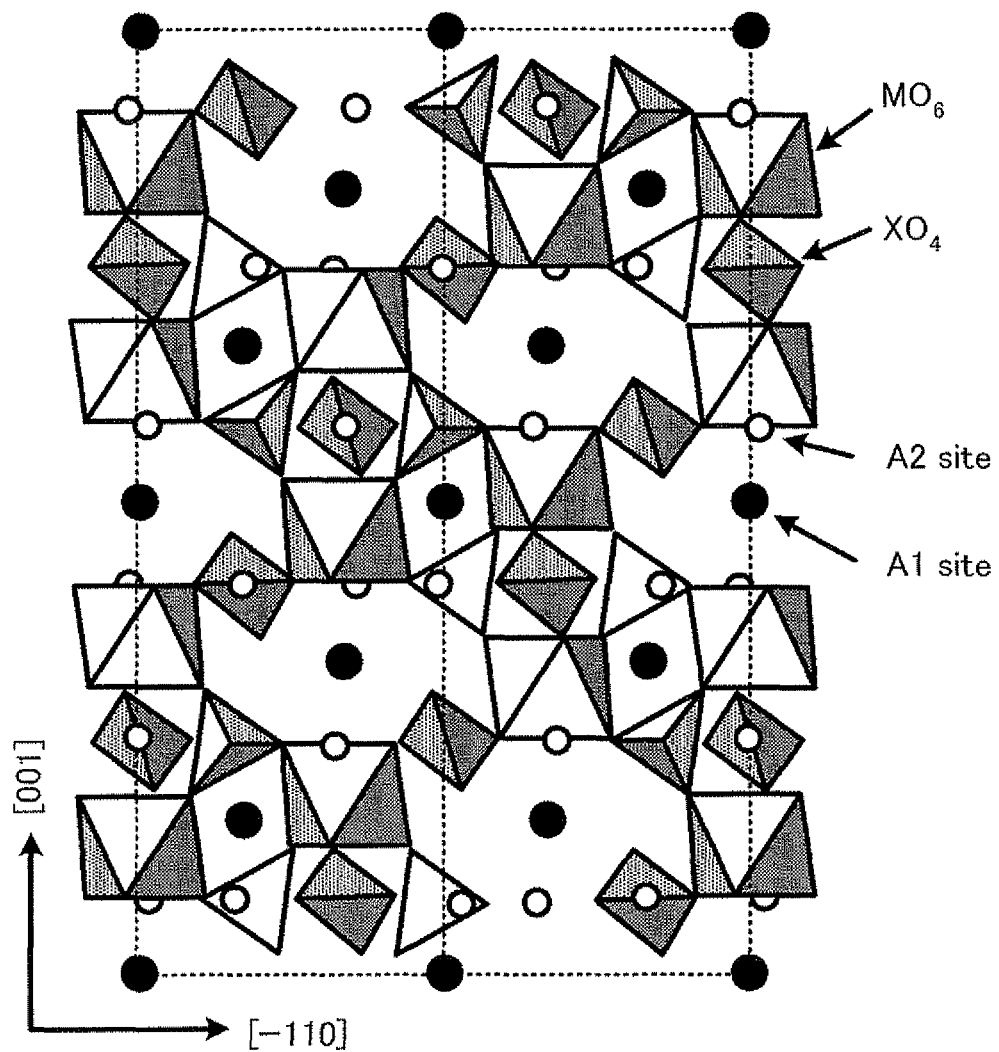
FIG. 2 is a schematic view of an example of a compound having a NASICON structure.

A positive electrode of an aqueous secondary battery according to the present invention may be formed by mixing a positive-electrode active material, an electroconductive material, and a binder to prepare a positive-electrode material and pressing the positive-electrode material on a collector or adding an appropriate solvent to the positive-electrode material to prepare a paste, applying the paste to the collector, drying the paste, and if necessary pressing the paste to increase electrode density. In an aqueous secondary battery according to the present invention, the positive-electrode active material is a compound having a NASICON structure (a NASICON-type positive-electrode active material) that can insert and extract sodium in an aqueous solution. In general, a Na super ionic conductor (NASICON) represents a solid electrolyte $Na_3Zr_2Si_2PO_{12}$. The NASICON structure, as used herein, refers to those belonging to the same crystal system as NASICON and has a general formula $A_aM_2(XO_4)_3$ (a=1 to 3, and A, M, and X are described below). An $MO_6$ octahedron and an $XO_4$ tetrahedron have a common vertex and constitute a three-dimensional network (see, for example, FIG. 2). As illustrated in FIG. 2, there are two sites in which A can exist. One site is a six-coordinate A1(6b) site, which is not included in the $MO_6$ octahedron or the $XO_4$ tetrahedron. The other site is a six-coordinate A2(18e) site, which is located on a ridgeline of the $MO_6$ octahedron or the $XO_4$ tetrahedron. It is presumed that in $AM_2(XO_4)_3$ (a=1) the A1 site is occupied by A and the A2 site is vacant, and in $A_3M_2(XO_4)_3$ (a=3) the A1 site and the A2 site are occupied by A. In the NASICON structure, some of A, M, X, and O elements in the general formula $A_aM_2(XO_4)_3$ may be substituted with another element. The NASICON structure may have a nonstoichiometric composition in which some of the elements are lost or excessive, as well as a stoichiometric composition. This description of $A_aM_2(XO_4)_3$ can be applied to $E_bL_2(RO_4)_3$ described below.

The NASICON-type positive-electrode active material can be expressed by the general formula $A_aM_2(XO_4)_3$, for example. In the general formula $A_aM_2(XO_4)_3$, A can denote at least one of alkali metals and alkaline-earth metals. A is preferably an alkali metal, more preferably at least one of Li and Na, still more preferably Na. M in the general formula $A_aM_2(XO_4)_3$ can be a transition metal. Examples of the transition metal include Ti, V, Cr, Mn, Fe, Zr, and Hf. Among them, at least one of Ti, V, and Fe is preferred, and V is more preferred. Part of the transition metal may be substituted with another transition metal or a non-transition metal, such as Ge or Sn. X in the general formula $A_aM_2(XO_4)_3$ can denote at least one of Si, P, S, As, Mo, and W. These elements can be bonded to four oxygen atoms to form an oxo acid salt having a rigid three-dimensional skeleton. X is preferably at least one of Si, P, and S, more preferably P. In the general formula $A_aM_2(XO_4)_3$, a ranges from 1 to 3. When A in the general formula $A_aM_2(XO_4)_3$ is Na, it is presumed that $A_aM_2(XO_4)_3$ is $Na_3M_2(XO_4)_3$ in a discharged state and $NaM_2(XO_4)_3$ in a charged state. A compound having the general formula $A_aM_2(XO_4)_3$ preferably has a NASICON structure at least in a discharged state (a=3). In an aqueous secondary battery according to the present invention, the positive-electrode active material may be the NASICON-type positive-electrode active material alone or a combination of at least two NASICON-type positive-electrode active materials or may contain another compound. In an aqueous secondary battery according to the present invention, an appropriate combination of the NASICON-type positive-electrode active materials described above can be used as the positive-electrode active material. Preferably, the positive-electrode active material contains $Na_3V_2(PO_4)_3$. $Na_3V_2(PO_4)_3$ has a Na insertion/extraction potential (or an intercalation/deintercalation potential) of approximately 0.5 V (vs. Ag/AgCl), allowing for charge and discharge at such an electric potential that no oxygen is generated on the positive electrode. Thus, $Na_3V_2(PO_4)_3$ can achieve a high battery voltage (energy density) and is preferred. It is not known that $Na_3V_2(PO_4)_3$ is used as a material for aqueous sodium batteries. The positive-electrode active material may be coated with a conductive phase. Since the compound having a NASICON structure is an insulator in many cases, it is preferable to increase electrical conductivity. The conductive phase may be any phase that can increase electrical conductivity and may be at least one of carbon, a metal, a nitride, a boride, an oxide, and an electroconductive polymer.

In the case that the negative electrode contains a NASICON-type negative-electrode active material, the positive-electrode active material may be any active material that can insert and extract sodium in an aqueous solution and may contain another active material other than the NASICON-type positive-electrode active material, for example, $LiFePO_4$. The positive-electrode active material may be a mixture of at least two complex oxides and compounds. As in $LiM_{1-x}Fe_xPO_4$ (M denotes a transition metal, and X denotes a positive number), one transition metal may be substituted with another transition metal.

An electroconductive material in the positive electrode may be any electron-conducting material that does not adversely affect the battery performance of the positive electrode and may be one or two or more of graphite, such as natural graphite (scaly graphite and flake graphite) and artificial graphite, acetylene black, carbon black, ketjen black, carbon whiskers, needle coke, carbon fiber, and metals (such as copper, nickel, aluminum, silver, and gold). Among these, the electroconductive material is preferably carbon black and acetylene black in terms of electron conductivity and coatability. The binder binds active material particles and electroconductive material particles and may be one or at least two of fluorocarbon resins, such as polytetrafluoroethylene (PTFE), poly(vinylidene fluoride) (PVDF), and fluorocarbon rubbers, thermoplastic resins, such as polypropylene and polyethylene, ethylene-propylene-diene monomer (EPDM), sulfonated EPDM, natural butyl rubber (NBR), styrene-butadiene rubber (SBR), and polyacrylonitrile (PAN). A solvent for dispersing the positive-electrode active material, the electroconductive material, and the binder may be water or an organic solvent. Examples of the organic solvent include N-methylpyrrolidone, dimethylformamide, dimethylacetamide, methyl ethyl ketone, cyclohexanone, methyl acetate, methyl acrylate, diethyltriamine, N,N-dimethylaminopropylamine, ethylene oxide, and tetrahydrofuran. Examples of the coating method include roll coating, such as applicator rolls, screen coating, a doctor blade method, spin coating, and bar coating. A predetermined thickness and shape can be achieved by any of these methods. The collector may be formed of aluminum, titanium, stainless steel, nickel, baked carbon, an electroconductive polymer, or electroconductive glass. In view of electrical conductivity and corrosion resistance, the collector is preferably formed of at least one selected from aluminum, nickel, and titanium. The collector may be formed of at least two selected from the substances described above. The collector may be foil, a film, a sheet, a net, a punched or expanded member, a lath, a porous member, foam, or a fiber member. The collector may have a thickness in the range of 1 to 500 μm.

A negative electrode of an aqueous secondary battery according to the present invention may be formed by mixing a negative-electrode active material, an electroconductive material, and a binder to prepare a negative-electrode material and pressing the negative-electrode material on a collector or adding an appropriate solvent to the negative-electrode material to prepare a paste, applying the paste to the collector, drying the paste, and if necessary pressing the paste to increase electrode density. In an aqueous secondary battery according to the present invention, if the positive electrode contains a NASICON-type positive-electrode active material, the negative-electrode active material may be any active material that can insert and extract sodium in an aqueous solution. The negative-electrode active material is preferably a compound having a NASICON structure (a NASICON-type negative-electrode active material) that can insert and extract sodium in an aqueous solution. Thus, it is preferable that not only the positive-electrode active material but also the negative-electrode active material has the NASICON structure, because charge-discharge stability can be improved. The reason for the improvement in charge-discharge stability is that the positive-electrode active material and the negative-electrode active material having the same crystal structure probably have substantially the same side reaction and volume change during charge and discharge. There is no report on an aqueous sodium secondary battery that contains a positive-electrode active material and a negative-electrode active material of the same crystal system. In this regard, the present invention is based on a novel technical idea. The NASICON-type negative-electrode active material can be expressed by the general formula $E_bL_2(RO_4)_3$, for example. In the general formula $E_bL_2(RO_4)_3$, E can denote at least one of alkali metals and alkaline-earth metals. E is preferably an alkali metal, more preferably at least one of Li and Na, still more preferably Na. L in the general formula $E_bL_2(RO_4)_3$ can be a transition metal. Examples of the transition metal include Ti, V, Cr, Mn, Fe, Zr, and Hf. Among them, at least one of Ti, V, and Fe is preferred, and Ti is more preferred. Part of the transition metal may be substituted with another transition metal or a non-transition metal, such as Ge or Sn. R in the general formula $E_bL_2(RO_4)_3$ can denote at least one of Si, P, S, As, Mo, and W. These elements can be bonded to four oxygen atoms to form an oxo acid salt having a rigid three-dimensional skeleton. R is preferably at least one of Si, P, and S, more preferably P. b in the general formula $E_bL_2(RO_4)_3$ ranges from 1 to 3. When E in the general formula $E_bL_2(RO_4)_3$ is Na, it is presumed that $E_bL_2(RO_4)_3$ is $NaL_2(RO_4)_3$ in a discharged state and $Na_3L_2(RO_4)_3$ in a charged state. A compound having the general formula $E_bL_2(RO_4)_3$ preferably has the NASICON structure at least in a discharged state (b=1). In an aqueous secondary battery according to the present invention, the negative-electrode active material may be the NASICON-type negative-electrode active material alone or a combination of at least two NASICON-type negative-electrode active materials or may contain another compound. In an aqueous secondary battery according to the present invention, an appropriate combination of the NASICON-type negative-electrode active materials described above can be used as the negative-electrode active material. Preferably, the negative-electrode active material contains at least one of $LiTi_2(PO_4)_3$ and $NaTi_2(PO_4)_3$. $LiTi_2(PO_4)_3$ and $NaTi_2(PO_4)_3$ have a sodium insertion/extraction potential of approximately −0.75 V (vs. Ag/AgCl). This electric potential is an appropriate negative electrode potential in consideration of overvoltage at which hydrogen is generated on the negative electrode, allowing for a higher battery voltage, and is therefore preferred. The negative-electrode active material does not need to have the NASICON structure. Preferably, the negative-electrode active material is coated with a conductive phase. Since compounds having the NASICON structure, particularly compounds containing titanium and phosphorus (such as phosphoric acid), are often insulators, it is preferable to increase electrical conductivity. The conductive phase may be any phase that can increase electrical conductivity and may be at least one of carbon, a metal, a nitride, a boride, an oxide, and an electroconductive polymer.

The electroconductive material, the binder, and the solvent for use in the negative electrode may be those exemplified for the positive electrode. The collector in the negative electrode may be formed of aluminum, nickel, stainless steel, titanium, baked carbon, an electroconductive polymer, and electrical conductivity glass. In view of electrical conductivity and corrosion resistance, the collector is preferably formed of at least one selected from aluminum, nickel, and titanium. The collector may be formed of at least two selected from the substances described above. The collector may have the same form as in the positive electrode.

In an aqueous secondary battery according to the present invention, the positive-electrode active material can be combined with any negative-electrode active material provided that the battery operates properly with the combination. Preferably, the positive-electrode active material is $Na_3V_2(PO_4)_3$, and the negative-electrode active material is at least one of $LiTi_2(PO_4)_3$ and $NaTi_2(PO_4)_3$. This is because $Na_3V_2(PO_4)_3$ has a Na insertion/extraction potential (or an intercalation/deintercalation potential (the same shall apply hereinafter)) of approximately 0.5 V (vs. Ag/AgCl), $LiTi_2(PO_4)_3$ and $NaTi_2(PO_4)_3$ have a sodium insertion/extraction potential of approximately −0.75 V (vs. Ag/AgCl), and the resulting battery voltage is as high as approximately 1.25 V. The positive electrode and the negative electrode may have different Na insertion/extraction potentials. When both of the positive electrode and the negative electrode are of the NASICON type, the positive-electrode active material and the negative-electrode active material may have the same element composition or different element compositions. Preferably, the positive-electrode active material and the negative-electrode active material have different element compositions. As an example of the same element composition, the positive electrode is $A_3M_2(XO_4)_3$ and the negative electrode is $AM_2(XO_4)_3$ in the discharged state, or the positive electrode is $A_2M_2(XO_4)_3$ and the negative electrode is $M_2(XO_4)_3$ in the discharged state, wherein each of A, M, and X denotes the same element in the positive electrode and the negative electrode. In the case that the active materials of the positive electrode and the negative electrode exhibit two-stage charge-discharge behavior (have two plateaus in the charge-discharge curve), the active materials may have the same element composition.

In an aqueous secondary battery according to the present invention, the aqueous electrolyte solution may be any aqueous electrolyte solution that contains a sodium salt as the main electrolyte. Examples of the sodium salt include $NaNO_3$, $Na_2SO_4$, NaOH, NaCl, and $CH_3COONa$. Among these, $NaNO_3$ is preferred in terms of solubility. These sodium salts may be used alone or in combination. Preferably, the aqueous electrolyte solution contains 1 mol/l or more sodium ions. This results in a sufficiently high exchange current density in the electrode reaction, achieving excellent output characteristics. Preferably, the sodium ion concentration is below the solubility limit. Preferably, the aqueous electrolyte solution has a pH in the range of 3 to 11. At a pH of the aqueous electrolyte solution of 3 or more, the overvoltage at which hydrogen is generated on the negative electrode is not excessively decreased, thereby preventing hydrogen generation, which is a side reaction, from competing with the cell reaction to reduce the charge-discharge efficiency. At a pH of the aqueous electrolyte solution of 11 or less, the overvoltage at which oxygen is generated on the positive electrode is not excessively decreased, thereby preventing oxygen generation, which is a side reaction, from competing with the cell reaction to reduce the charge-discharge efficiency. At a pH of the aqueous electrolyte solution in the range of 3 to 11, for example, the elution of metal from the collectors of the positive and negative electrodes can be prevented.

An aqueous secondary battery according to the present invention may include a separator between the positive electrode and the negative electrode. Preferably, the separator is subjected to hydrophilic treatment or perforated such that the separator can be permeated with an aqueous electrolyte solution, allowing ions to pass through the separator. The separator may be any separator that can be used in sodium secondary batteries. Examples of the separator include polymer nonwoven fabrics, such as polypropylene nonwoven fabric and poly(phenylene sulfide) nonwoven fabric, and macroporous membranes of olefin resins, such as polyethylene and polypropylene. These can be used alone or in combination.

Figure 1:
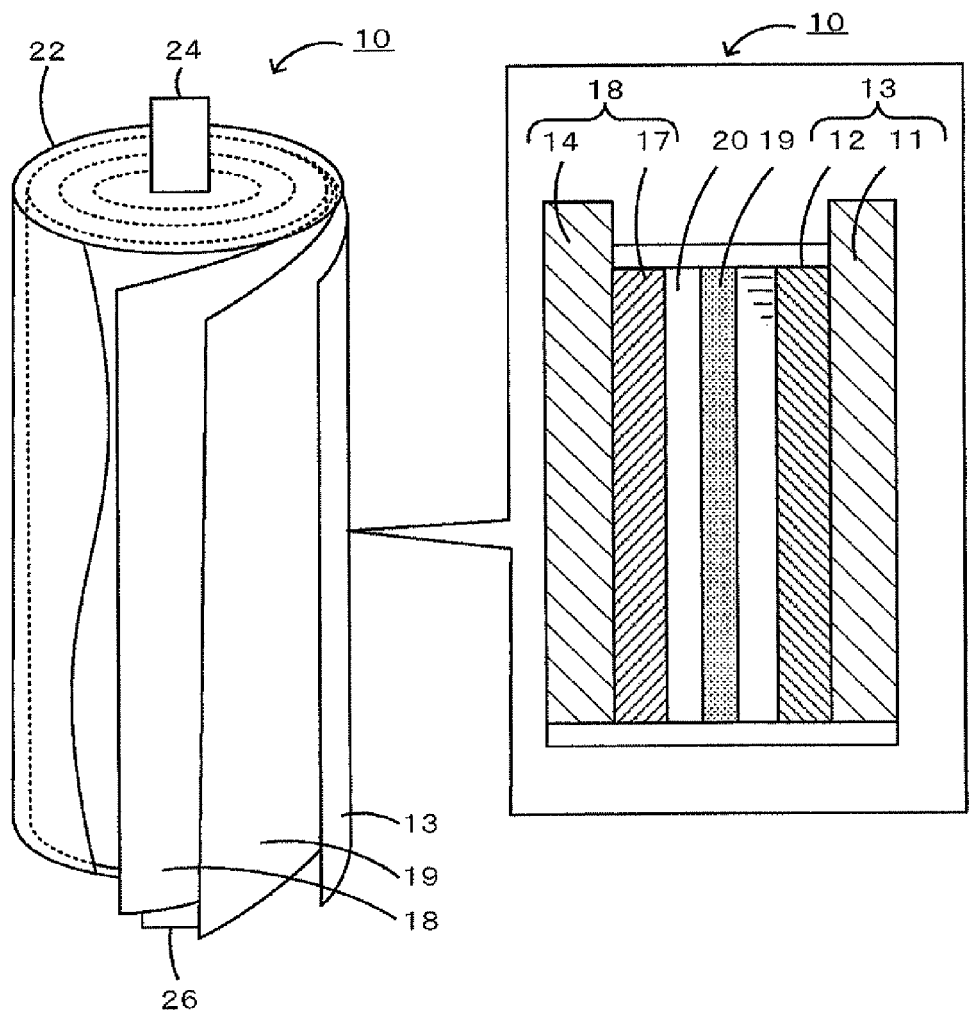
FIG. 1 is a schematic view of an aqueous secondary battery 10 according to an embodiment of the present invention.

An aqueous secondary battery according to the present invention may be of any shape, such as coin-shaped, button-shaped, sheet-shaped, layered, cylindrical, flat, or square. An aqueous secondary battery according to the present invention may be applied to large objects, such as electric vehicles. FIG. 1 is a schematic view of an aqueous secondary battery 10 according to an embodiment of the present invention. The aqueous secondary battery 10 includes a positive electrode sheet 13 in which a positive-electrode active material 12 is formed on a collector 11, a negative electrode sheet 18 in which a negative-electrode active material 17 is formed on a collector 14, a separator 19 disposed between the positive electrode sheet 13 and the negative electrode sheet 18, and an electrolyte solution 20 filling the space between the positive electrode sheet 13 and the negative electrode sheet 18. In the aqueous secondary battery 10, the positive electrode sheet 13, the negative electrode sheet 18, and the separator 19 between the positive electrode sheet 13 and the negative electrode sheet 18 are rolled up and placed in a cylindrical case 22. The positive electrode sheet 13 is connected to a positive terminal 24. The negative electrode sheet 18 is connected to a negative terminal 26. The positive-electrode active material 12 is a NASICON-type positive-electrode active material (for example, $Na_3V_2(PO_4)_3$). The negative-electrode active material 17 is a NASICON-type negative-electrode active material (for example, $LiTi_2(PO_4)_3$ or $NaTi_2(PO_4)_3$). The electrolyte solution 20 is an aqueous solution in which sodium is dissolved.

The aqueous secondary battery according to the present embodiment detailed above contains a compound having a NASICON structure (for example, $Na_3V_2(PO_4)_3$, $LiTi_2(PO_4)_3$, or $NaTi_2(PO_4)_3$) as the active material and can insert and extract sodium ions in an aqueous electrolyte solution. The aqueous secondary battery can improve energy density. The aqueous secondary battery can produce higher output power and have better high rate performance than non-aqueous secondary batteries or aqueous lithium secondary batteries. This is probably because the aqueous electrolyte solution has an electric conductivity at least 10 times the electric conductivity of non-aqueous organic solvents. This is also probably because sodium ions in an aqueous solution have a weaker interaction with hydration water, have lower dehydration energy in the insertion and extraction of sodium ions, which is an electrode reaction, and can react faster than lithium ions in an aqueous solution in aqueous lithium secondary batteries. The fact that sodium ions generally have higher electric conductivity than lithium ions may also contribute to the improvement in output characteristics. From the viewpoint of resources, sodium is abundant in the crust of the earth and seawater and has advantages in terms of cost and mass productivity. It is preferable that not only the positive-electrode active material but also the negative-electrode active material has the NASICON structure, because the side reactions and volume change during charge and discharge are substantially the same, and therefore charge-discharge stability can be improved.

The present invention is not limited to the above-mentioned embodiments and can be implemented as various embodiments within the scope of the present invention.

EXAMPLES

In the following examples, an aqueous secondary battery that contained a NASICON-type compound as an active material was fabricated. First, a method for producing an active material will be described.

Production of $Na_3V_2(PO_4)_3$

Vanadium pentoxide, sodium carbonate, and ammonium dihydrogen phosphate were mixed at a composition of $Na_3V_2(PO_4)_3$ and were calcined at 300° C. in an atmosphere of Ar for 12 hours to produce a powder. The powder was completely crushed and was formed into a pellet. The pellet was heated at 850° C. in an atmosphere of $H_2$ (4%)/$N_2$ to produce a $Na_3V_2(PO_4)_3$ powder.

Production of $LiTi_2(PO_4)_3$

Titanium isopropoxide, lithium acetate, and ammonium dihydrogen phosphate were used as raw materials. A solution of titanium isopropoxide in propanol was mixed with lithium acetate and ammonium dihydrogen phosphate dissolved in water at a composition of $LiTi_2(PO_4)_3$ to hydrolyze the titanium isopropoxide. The resulting cloudy solution was dried under vacuum to produce a white powder. The powder was heat-treated at 400° C. for 12 hours and was fired at 700° C. in the air for 16 hours to produce a $LiTi_2(PO_4)_3$ powder. The $LiTi_2(PO_4)_3$ powder was coated with carbon to increase electrical conductivity. The $LiTi_2(PO_4)_3$ powder was added to an aqueous solution in which sucrose was dissolved as a carbon source. The $LiTi_2(PO_4)_3$ powder was dried and was treated at 650° C. in an inert atmosphere (Ar) for 4 hours to coat the active material powder with carbon.

Production of $NaTi_2(PO_4)_3$

A $NaTi_2(PO_4)_3$ powder was produced in the same manner as $LiTi_2(PO_4)_3$ except that lithium acetate was replaced with sodium acetate. The resulting powder was coated with carbon as in $LiTi_2(PO_4)_3$.

Production of $LiFePO_4$

Starting materials of iron (II) oxalate, lithium carbonate, and ammonium dihydrogen phosphate were mixed at a Li:Fe:P molar ratio of 1.2:1:1 and was formed into a pellet. The pellet was fired at 650° C. in an atmosphere of Ar for 24 hours to produce $LiFePO_4$.

Example 1

An aqueous secondary battery was fabricated that included a positive electrode containing $Na_3V_2(PO_4)_3$ as a positive-electrode active material, a negative electrode containing $NaTi_2(PO_4)_3$ as a negative-electrode active material, and an aqueous electrolyte solution containing $NaNO_3$ as the electrolyte. 90% by weight of $Na_3V_2(PO_4)_3$ as the positive-electrode active material, 6% by weight of carbon black as the electroconductive material, and 4% by weight of a mixture of carboxymethylcellulose and styrene-butadiene rubber as the binder were sufficiently mixed. A proper amount of water was added to the mixture as a dispersant. The mixture was dispersed to produce a positive electrode mixture slurry. This positive electrode mixture was applied to both surfaces of aluminum foil having a thickness of 20 μl, was dried, and was densified with a roll press to produce a positive sheet electrode. 80% by weight of $NaTi_2(PO_4)_3$ as the negative-electrode active material, 10% by weight of carbon black as the electroconductive material, and 10% by weight of a mixture of carboxymethylcellulose and styrene-butadiene rubber as the binder were sufficiently mixed. A proper amount of water was added to the mixture as a dispersant. The mixture was dispersed to produce a negative electrode mixture slurry. This negative electrode mixture was applied to both surfaces of aluminum foil having a thickness of 20 μm, was dried, and was densified with a roll press to produce a negative sheet electrode. A 6 mol/L aqueous $NaNO_3$ solution was used as the electrolyte solution. The positive and negative sheet electrodes were rolled up with a hydrophilic-treated olefin separator interposed therebetween. The roll was placed in a cylindrical polypropylene battery case. After the electrolyte was poured into the case, the case was hermetically sealed with a top lid. This battery was regulated by the positive electrode and had a design capacity of 200 mAh. A collector tab and a collector cap were formed of aluminum. Thus, an aqueous secondary battery according to Example 1 was fabricated.

Example 2

An aqueous secondary battery according to Example 2 was fabricated in the same way as in Example 1 except that the negative-electrode active material was $LiTi_2(PO_4)_3$.

Example 3

An aqueous secondary battery according to Example 3 was fabricated in the same way as in Example 1 except that the positive electrode contained $LiFePO_4$ as the positive-electrode active material, and the negative electrode contained $LiTi_2(PO_4)_3$ as the negative-electrode active material.

Example 4

An aqueous secondary battery according to Example 4 was fabricated in the same way as in Example 1 except that the positive electrode contained $LiFePO_4$ as the positive-electrode active material, and the negative electrode contained $NaTi_2(PO_4)_3$ as the negative-electrode active material.

Comparative Example 1

An aqueous lithium secondary battery according to Comparative Example 1 was fabricated in the same way as in Example 1 except that the positive-electrode active material was $LiFePO_4$, the negative-electrode active material was $LiTi_2(PO_4)_3$, and the electrolyte was 6 mol/L aqueous $LiNO_3$ solution. Since use of the positive-electrode active material $LiFePO_4$ results in a low positive electrode capacity per unit weight and slightly unstable charge-discharge behavior, an excessive amount of positive-electrode active material was used so that the battery was regulated by the negative electrode.

Comparative Example 2

A non-aqueous lithium secondary battery according to Comparative Example 2 was fabricated in the same way as in Comparative Example 1 except that an electrolyte solution in which 1 mol/L $LiPF_6$ was dissolved in an organic solvent of ethylene carbonate and diethyl carbonate mixed at a weight ratio of 3:7.

Evaluation of Battery Performance

The charge and discharge of the batteries thus fabricated was performed at 20 mA with an upper limit voltage of 1.5 V for Examples 1 and 2 (1.2 V for Comparative Example 1 and 1.3 V for Comparative Example 2) and a lower limit voltage of 0.9 V for Examples 1 and 2 (0.6 V for Comparative Examples 1 and 2). This discharge capacity is referred to as "20 mA capacity". A voltage drop was measured in discharge at 200 mA for 10 seconds from 50% state of charge (SOC=50%). This voltage drop is referred to as "200 mA polarization". The discharge capacity in discharge at 200 mA after constant-current charge at 20 mA to the upper limit voltage is referred to as "200 mA capacity". The 200 mA capacity divided by the 20 mA capacity is defined as "rate performance". The open-circuit voltage at SOC=50% is referred to as "SOC50% OCV". For Examples 3 and 4, the upper limit voltage was 1.3 V, and the lower limit voltage was 0.7 V. For Comparative Example 1, the upper limit voltage was 1.2 V, and the lower limit voltage was 0.6 V. For Comparative Example 2, the upper limit voltage was 1.3 V, and the lower limit voltage was 0.6 V. Table 1 shows battery components and test conditions in Examples 1 to 4 and Comparative Examples 1 and 2.

TABLE 1

| | Positive Electrode | Negative Electrode | Electrolyte Solution | Upper Limit Voltage (V) | Lower Limit Voltage (V) |
| --- | --- | --- | --- | --- | --- |
| Example 1 | $Na_3V_2(PO_4)_3$ | $NaTi_2(PO_4)_3$ | Aqueous Solution 6M $NaNO_3$ | 1.5 | 0.9 |
| Example 2 | $Na_3V_2(PO_4)_3$ | $LiTi_2(PO_4)_3$ | Aqueous Solution 6M $LiNO_3$ | 1.5 | 0.9 |
| Example 3 | $LiFePO_4$ | $LiTi_2(PO_4)_3$ | Aqueous Solution 6M $LiNO_3$ | 1.3 | 0.7 |
| Example 4 | $LiFePO_4$ | $NaTi_2(PO_4)_3$ | Aqueous Solution 6M $LiNO_3$ | 1.3 | 0.7 |
| Comparative Example 1 | $LiFePO_4$ | $LiTi_2(PO_4)_3$ | Aqueous Solution 6M $LiNO_3$ | 1.2 | 0.6 |
| Comparative Example 2 | $LiFePO_4$ | $LiTi_2(PO_4)_3$ | 1M $LiPF_6$ EC/DEC Solution | 1.3 | 0.6 |

Experimental Results

Table 1 shows battery components in Examples 1 to 4 and Comparative Examples 1 and 2. Table 2 shows 20 mA capacity, 200 mA polarization, 200 mA capacity, rate performance, and SOC50% OCV. In Examples 1 to 4 and Comparative Examples 1 and 2, the 20 mA capacity was approximately 200 mAh. The charge-discharge potentials of the positive electrode and the negative electrode in Examples 1 and 2 can be wider than Comparative Examples within the electrolysis potential of water. Thus, the battery voltages (SOC50% OCV) in Examples 1 and 2 were approximately 0.3 V higher than Comparative Examples, resulting in higher energy density even when the capacities are the same. The 200 mA polarization is a measure of the output characteristics of the battery. A smaller voltage drop indicates better output characteristics (lower I-V resistance). Examples 1 to 4 showed a smaller voltage drop and better output characteristics than Comparative Example 1. This is probably because the interaction of sodium ions with water is smaller than the interaction of lithium ions with water. Comparative Example 2 had a 200 mA polarization of 115 mV, which was much higher than the others. This is probably because the aqueous electrolyte solution had an electric conductivity at least 10 times the electric conductivity of the non-aqueous electrolyte solution. Comparative Example 2 showed the lowest rate performance. This is probably because the aqueous electrolyte solution used in the examples had an electric conductivity at least 10 times that of the non-aqueous electrolyte solution used in the examples, and because the sodium ion concentration of the aqueous electrolyte solution was far higher than lithium ion concentration of the non-aqueous electrolyte solution, sodium ion activity became large and caused small reaction resistance. These results show that Examples 1 to 4 can insert and extract sodium ions in an aqueous solution and had better output characteristics and rate performance than Comparative Examples. In particular, Examples 1 and 2 can further increase energy density. This is because the battery voltage resulting from the combination of active materials have the highest battery voltage of 1.24 V to 1.25 V when $Na_3V_2(PO_4)_3$ is used for the positive electrode and $NaTi_2(PO_4)_3$ or $LiTi_2(PO_3$ is used for the negative electrode.

TABLE 2

| | 20 mA Capacity X(mAh) | 200 mA Polarization (mV) | 200 mA Capacity Y(mAh) | Rate Performance Y/X | SOC50% OCV (V) |
|---|---|---|---|---|---|
| Example 1 | 205 | 18.8 | 182 | 0.89 | 1.25 |
| Example 2 | 202 | 19.3 | 178 | 0.88 | 1.24 |
| Example 3 | 214 | 20.3 | 186 | 0.87 | |
| Example 4 | 209 | 20.1 | 187 | 0.89 | |
| Comparative Example 1 | 205 | 24.5 | 174 | 0.85 | 0.96 |
| Comparative Example 2 | 189 | 115 | 85 | 0.45 | 0.96 |

The present application claims priorities from Japanese Patent Application No. 2009-236339 filed on Oct. 13, 2009, and Japanese Patent Application No. 2010-137419 filed on Jun. 16, 2010, the entire contents of both of which are incorporated herein by reference.

What is claimed is:

1. An aqueous secondary battery in which sodium is dissolved, comprising:
a positive electrode including a positive-electrode active material that can insert and extract sodium;
a negative electrode including a negative-electrode active material that can insert and extract sodium; and
an electrolyte solution disposed between the positive electrode and the negative electrode, the electrolyte solution being an aqueous solution in which sodium is dissolved, wherein
the negative electrode includes a NASICON negative electrode active material that can insert and extract sodium, and
the NASICON negative electrode active material has a general formula of $E_bL_2(RO_4)_3$, wherein E denotes at least one of alkali metals and alkaline-earth metals, L denotes a transition metal, R denotes at least one of S, P, As, Mo, Si and W, and b ranges from 1 to 3.

2. The aqueous secondary battery according to claim 1, wherein the positive electrode includes a NASICON positive-electrode active material.

3. The aqueous secondary battery according to claim 1, wherein the positive electrode includes a NASICON positive-electrode active material having a general formula of $A_aM_2(XO_4)_3$, wherein A denotes at least one of alkali metals and alkaline-earth metals, M denotes a transition metal, X denotes at least one of Si, P, S, As, Mo, and W, and a ranges from 1 to 3.

4. The aqueous secondary battery according to claim 1, wherein the positive electrode includes a NASICON positive-electrode active material having a general formula of $Na_3V_2(PO_4)_3$.

5. The aqueous secondary battery according to claim 1, wherein the electrolyte solution includes a concentration of 1 mol/L or more sodium ions.

6. The aqueous secondary battery according to claim 1, wherein the electrolyte solution has a pH in the range of 3 to 11.

7. The aqueous secondary battery according to claim 1, wherein at least one of the positive-electrode active material and the negative-electrode active material is coated with a conductive phase.

8. The aqueous secondary battery according to claim 1, wherein the positive electrode and the negative electrode include a collector formed of at least one selected from aluminum, nickel, and titanium.

9. An aqueous secondary battery in which sodium is dissolved, comprising:
a positive electrode including a positive-electrode active material that can insert and extract sodium;
a negative electrode including a negative-electrode active material that can insert and extract sodium; and
an electrolyte solution disposed between the positive electrode and the negative electrode, the electrolyte solution being an aqueous solution in which sodium is dissolved, wherein
the negative electrode includes a NASICON negative electrode active material that can insert and extract sodium, and
the NASICON negative electrode active material has at least one of general formulae $LiTi_2(PO_4)_3$ and $NaTi_2(PO_4)_3$.

10. The aqueous secondary battery according to claim 9, wherein the positive electrode includes a NASICON positive-electrode active material.

11. The aqueous secondary battery according to claim 9, wherein the positive electrode includes a NASICON positive-electrode active material having a general formula of $A_aM_2(XO_4)_3$, wherein A denotes at least one of alkali metals and alkaline-earth metals, M denotes a transition metal, X denotes at least one of Si, P, S, As, Mo, and W, and a ranges from 1 to 3.

12. The aqueous secondary battery according to claim 9, wherein the positive electrode includes a NASICON positive-electrode active material having a general formula of $Na_3V_2(PO_4)_3$.

13. The aqueous secondary battery according to claim 9, wherein the electrolyte solution includes a concentration of 1 mol/L or more sodium ions.

14. The aqueous secondary battery according to claim 9, wherein the electrolyte solution has a pH in the range of 3 to 11.

15. The aqueous secondary battery according to claim 9, wherein at least one of the positive-electrode active material and the negative-electrode active material is coated with a conductive phase.

16. The aqueous secondary battery according to claim 9, wherein the positive electrode and the negative electrode include a collector formed of at least one selected from aluminum, nickel, and titanium.

* * * * *